United States Patent
Tunc et al.

(10) Patent No.: US 11,934,173 B2
(45) Date of Patent: Mar. 19, 2024

(54) METHOD FOR GENERATING A TOOL PATH TO MANUFACTURE A PART USING A COMPUTER NUMERICAL CONTROL MACHINE SYSTEM

(71) Applicant: SABANCI UNIVERSITESI, Istanbul (TR)

(72) Inventors: Lutfi Taner Tunc, Istanbul (TR); Erhan Budak, Istanbul (TR)

(73) Assignee: SABANCI UNIVERSITESI, Istanbul (TR)

( * ) Notice: Subject to any disclaimer, the term of this patent is extended or adjusted under 35 U.S.C. 154(b) by 434 days.

(21) Appl. No.: 17/439,825

(22) PCT Filed: Apr. 24, 2019

(86) PCT No.: PCT/TR2019/050272
§ 371 (c)(1),
(2) Date: Sep. 16, 2021

(87) PCT Pub. No.: WO2020/218982
PCT Pub. Date: Oct. 29, 2020

(65) Prior Publication Data
US 2022/0187791 A1    Jun. 16, 2022

(51) Int. Cl.
*G05B 19/4093* (2006.01)
(52) U.S. Cl.
CPC ............... *G05B 19/40937* (2013.01); *G05B 2219/35184* (2013.01)
(58) Field of Classification Search
CPC .... G05B 19/40937; G05B 2219/35184; Y02P 90/02
See application file for complete search history.

(56) References Cited

U.S. PATENT DOCUMENTS

2002/0119020 A1* 8/2002 Hobbs .................. B23C 3/00
409/80
2005/0032469 A1* 2/2005 Duescher ............. B24D 11/001
451/548

(Continued)

FOREIGN PATENT DOCUMENTS

WO      2012107594 A1    8/2012

OTHER PUBLICATIONS

Scott Smith, et al., Sacrificial Structure Preforms for Thin Part Machining, CIRP Annals—Manufacturing Technology, 2012, pp. 379-382, 61:1.

(Continued)

*Primary Examiner* — Ziaul Karim
(74) *Attorney, Agent, or Firm* — Bayramoglu Law Offices

(57) ABSTRACT

A method for generating a tool path to manufacture a part using a computer numerical control system includes the steps of; generating an initial design part geometry from a geometry modelling program as an input, creating a pre-finished in-process workpiece geometry before a finishing process, controlling a stock thickness distribution of the pre-finished in-process workpiece geometry by following the tool path, wherein the stock thickness distribution is based on at least one ruling function on a basis of at least one predetermined direction, wherein the at least one ruling function is used to determine a stock thickness at a tool location to obtain a variable stock thickness distribution around a design part; locating at least one tool to be defined with respect to the initial design part geometry.

14 Claims, 9 Drawing Sheets

(56) References Cited

U.S. PATENT DOCUMENTS

| | | | | |
|---|---|---|---|---|
| 2007/0027571 | A1* | 2/2007 | Kamiya | G05B 19/4093 700/86 |
| 2007/0038531 | A1* | 2/2007 | Lukis | G06Q 50/04 705/26.4 |
| 2012/0107594 | A1* | 5/2012 | Kang | H10N 30/878 423/276 |
| 2015/0205291 | A1* | 7/2015 | Henning | B64D 47/08 700/97 |
| 2019/0054700 | A1* | 2/2019 | Chandar | G06F 17/18 |

OTHER PUBLICATIONS

Erhan Budak, et al., Prediction of workpiece dynamics and its effects on chatter stability in milling, CIRP Annals—Manufacturing Technology, 2012, pp. 339-342, 61.

Lutfi Taner Tunc, et al., Process simulation integrated tool axis selection for 5-axis tool path generation, CIRP Annals—Manufacturing Technology, 2016, pp. 381-384, 65.

Guillem Quintana, et al, Chatter in machining processes: A review, International Journal of Machine Tools and Manufacture, 2011, pp. 363-376, 51.

J Tlusty, Analysis of the State of Research in Cutting Dynamics, Annals of the CIRP, 1978, pp. 583-589, 27(2).

J. Munoa, et al., Chatter suppression techniques in metal cutting, CIRP Annals—Manufacturing Technology, 2016, pp. 785-808, 65(2).

Y. Altintas, et al., Virtual Process Systems for Part Machining Operations, CIRP Annals—Manufacturing Technology, 2014.

Gabor Stepan, et al., Chatter avoidance in cutting highly flexible workpieces, CIRP Annals—Manufacturing Technology, 2017, pp. 377-380, 66(1).

S. Ehsan Layegh K., et al., Analysis of Tool Orientation for 5-axis Ball-end Milling of Flexible Parts, CIRP Annals—ManufacturingTechnology, 2015, pp. 97-100, 64(1).

* cited by examiner

METHOD FOR GENERATING A TOOL PATH TO MANUFACTURE A PART USING A COMPUTER NUMERICAL CONTROL MACHINE SYSTEM

CROSS REFERENCE TO THE RELATED APPLICATIONS

This application is the national stage entry of International Application No. PCT/TR2019/050272, filed on Apr. 24, 2019, the entire contents of which are incorporated herein by reference.

TECHNICAL FIELD

The present invention relates to a method for manufacturing a part, more specifically to generation of a variable stock offset tool path for improved machining stability, part quality and productivity.

BACKGROUND

Recently, various tools have been designed to reduce human labour in manufacturing processes. Particularly, metal cutting, and additive manufacturing processes have been integrated into production process having computer-aided numerical control systems which provides the desired mechanical properties. Moreover, the machine tool is especially applicable to the processing of metallic and non-metallic components produced in aerospace, automotive, die-mold, medical, and nuclear manufacturing industries.

Generally, the machining process includes two main stages; roughing and finishing wherein roughing the unwanted volume of material is removed, the tool faces varying cutter-workpiece engagement boundaries (CWEB), whereas in finishing balanced cutting conditions are preferred for quality. In most of the manufacturing applications, significant part of the total cycle is spent in finishing where a thin wall feature may become structurally very flexible. On the other hand, as excessive cutting force variations in roughing may affect the in process workpiece (IPW) geometry in the finishing phase, semi-finishing passes may be needed before finishing, where the IPW is prepared for the finishing for balanced cutting loads with the aim of achieving the required part quality within the target manufacturing time. Additionally, additive manufacturing technologies are used in a wide range of industries, so as to achieve lower manufacturing cost and material waste. In the context of the additive manufacturing, a single part can comprise different types of material such as one end of the material provides enhanced strength whilst the other one provides heat resistance in conventional applications. Hence, many companies may prefer additive manufacturing methods with greater flexibility and without manufacturing limitations.

Conventional approaches to manufacture a part address machine tools equipped with cutting tools such as a drilling tool or a milling tool in which the number of controllable linear and rotational axes may be different that can be defined as X, Y, and Z are linear axes, while A rotating around X, B rotating around Y, and C rotating around Z, are rotational axes. For instance, four axis machines are additionally able to control one rotational axis (A, B or C) in order to tilt the tool relative to the Z axis of the machine coordinate system. In general, examples for a five axis CNC machine can work in various combinations of XYZAC, XYZBC or XYZAB axes and the cutting tool in CNC milling moves along five different axes simultaneously.

It should be stated that milling of thin wall parts and like is often difficult due to dominant structural dynamics of the IPW in significant areas such as aerospace industry, even the usage of CNC machine tools having two or more axis of motion which are precisely positioned automatically along the direction of movement. Hence, tool path generation for machining is a complex task, requiring efficient modeling for CAM systems based on NURBS type of curves [1] to meet various tool path generation requirements in the industry.

The location of the cutting tool with respect to the part is defined by series of cutter location points constituting the tool path, which needs to be geometrically generated. Although being advanced to perform the geometrical calculations for tool path generation, such algorithms consider only the geometry of the cutting tool and workpiece, ignoring the physics of metal cutting as shown in in FIG. 1, wherein while progressing from first stage to the second stage, the effect of stock thickness on IPW dynamics is not considered [2, 3]. Similarly, while progressing from the third stage to fourth stage the effect of tool axis on machining dynamics and stability is ignored. In manufacturing industry, any type of processing strategy needs to be implementable and available in the computer-aided manufacturing software packages for tool path generation. On the other hand, in some cases the efficient process parameters or strategies are known, but they may not be fully implemented in the process as the CAM system may not allow variable processing parameters to be implemented.

Chatter is self-excited type of vibration that can occur during machining operations (2) and is the major limitation in machining hence identification of chatter-free conditions is crucial in finishing of thin-wall parts. Simulations are used to address the issues to avoid deflections and chatter [5, 6, 7]. Hence, modelling and simulation of IPW dynamics to predict stability limits is a useful approach. Different technologies have since evolved to improve stability. Stepan et al. [8] demonstrated chatter avoidance through finite elements (FE) modelling for turning of flexible parts. They identified the initial part diameter and chip width to avoid chatter. Adding dampers on the part surface is an alternative to chatter avoidance. Another strategy to avoid chatter is adjusting the tool axis, Layegh et al. [9] studied the effect of tool posture on 5-axis milling of flexible parts and showed that workpiece deflection can be decreased by proper selection of tool posture. However, their study was limited to rectangular plates.

However, such methods were limited in providing improved stability for milling of thin-wall parts in the finishing pass due to the limitations in the implementation at the CAM software. Further, another disadvantage to the conventional methods is that the flexible direction of the IPW is ignored in the tool axis selection which may lead to vibrations.

US 2002/119020 A1 discloses a machine tool to fashion objects from blocks of material having a material-remover able to move in at least two degrees of freedom and having the material controlled by processing circuitry. The processing circuitry determines a path along which the material-remover should move, allowing the depth of a cut made by the material remover to vary.

Most existing techniques in the state of the art, however, are based on constant stock and therefore there is not a well-developed approach for optimization of stock shape and tool axis for increased stability in 5-axis milling of complex thin-wall parts.

LIST OF REFERENCE DOCUMENTS

[1] Smith S, Wilhelm R, Dutterer B, Cherukuri H, Goel G (2012) Sacrificial structure preforms for thin part machining. CIRP Annals 61(1):379-82.
[2] Budak E, Tunç L T, Alan S, & Özgüven, H N (2012). Prediction of workpiece dynamics and its effects on chatter stability in milling. CIRP annals, 61(1), 339-342.
[3] Tunc, L. T., Budak, E., Bilgen, S., & Zatarain, M. (2016). Process simulation integrated tool axis selection for 5-axis tool path generation. CIRP Annals, 65(1), 381-384.
[4] Quintana, G., & Ciurana, J. (2011). Chatter in machining processes: A review. International Journal of Machine Tools and Manufacture, 51(5), 363-376.
[5] Tlusty J (1978) Analysis of the State of Research in Cutting Dynamics, CIRP Annals, 27(2):583-589.
[6] Munoa J, Beudaert X, Dombovari Z, Altintas Y, Budak E, Brecher C, Stepan G (2016) Chatter suppression techniques in metal cutting. CIRP Annals, 65(2):785-808.
[7] Altintas Y, Kersting P, Biermann D, Budak E (2014) Virtual Process Systems for Part Machining Operations. CIRP Annals 63(2):585-605.
[8] Stepan G, Kiss A K, Ghalamchi B, Sopanen J, Bachrathy D (2017) Chatter avoidance in cutting highly flexible workpieces. CIRP Annals 66(1):377-80.
[9] Layegh K S E, Yigit I E, Lazoglu I (2015) Analysis of Tool Orientation for 5-axis Ball-end Milling of Flexible Parts. CIRP Annals 64(1):97-100.

SUMMARY

A primary object of the present invention is to overcome the above mentioned shortcomings of the prior art.

Another object of the present invention is to provide a simple, compact and low-cost method for machining a workpiece.

Another object of the present invention is to provide a methodology for variable selection of stock shape for improved stability.

A further object of the present invention is to provide a novel tool path generation based on a variable stock strategy for achieving the desired pre-finish IPW shape, preferably and optionally decided by the process planner for improved process performance, productivity and quality.

Other objects of the present invention will become apparent from the accompanying drawings, brief descriptions of which follow in the next section as well as appended claims.

The present invention proposes generally a method for generating a tool path to manufacture a part using a Computer Numerical Control (CNC) system, the method comprising the steps of; generating an initial design part geometry from a geometry modelling program as an input, creating a pre-finish in-process workpiece (IPW) geometry before a finishing process, using a numerical control (NC) program by subtracting and/or adding tool processed volume such that leaving behind a post-form having an amount of stock thickness with respect to surface normal vectors of the corresponding surfaces of the design part, controlling the stock thickness distribution of the said pre-finished in-process workpiece geometry by following the said tool path, the location of a tool to be defined with respect to the design part geometry wherein the said location to be calculated by using the design part surface information and the corresponding stock thickness value which is calculated on the basis of the said ruling function and, using the individual stock thickness values to calculate a tool path defined a series of subtracting or adding tool location points.

BRIEF DESCRIPTION OF THE DRAWINGS

The figures, whose brief explanation is herewith provided, are solely intended for providing a better understanding of the present invention and are as such not intended to define the scope of protection or the context in which said scope is to be interpreted in the absence of the description.

DETAILED DESCRIPTION OF THE EMBODIMENTS

Figure 1:
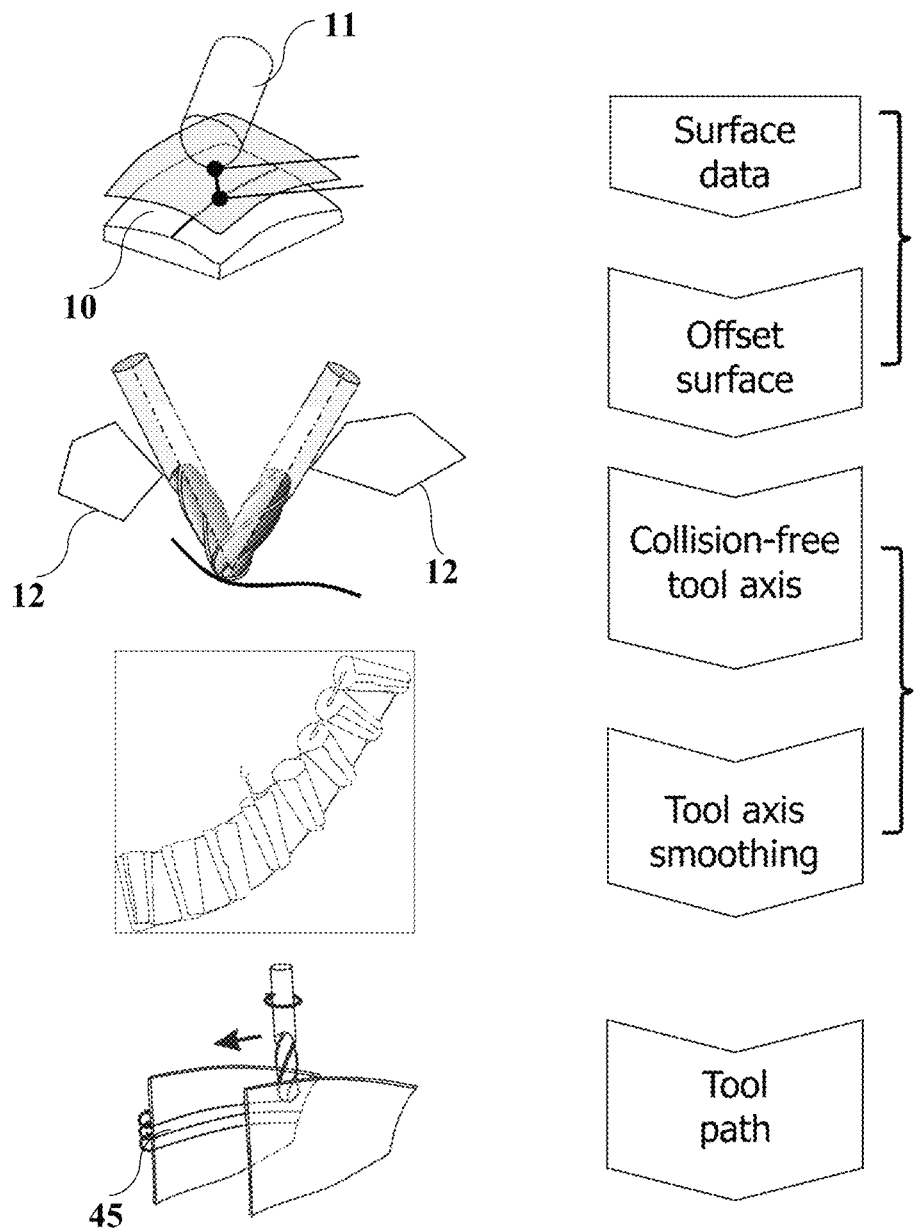
FIG. 1 is a flow diagram illustrating the prior art.

Hereinafter, preferred embodiments of the present invention will be described in detail with reference to the accompanying drawings which are given solely for the purpose of exemplifying embodiments according to the present invention.

The list of reference numerals used in the appended drawings are as follows;
10. Part
11. Tool
12. Obstacle
20. Pre-finished in-process workpiece geometry
21. In-process workpiece
22. Tool location
23. Tool processed volume
25. Stock thickness
26. Design part
31. Rough stock material
32. Nominal stock
41. Surface normal
42. P(u,v) Part surface location 43. S(u,v) Cutter/Tool contact point
44. CL(u,v) Cutter location
45. Tool path
49. Tool axis
50. First distance along v direction
51. Second distance along v direction
52. Consecutive blade
100. Stable cut
101. Chatter region
102. Edge
104. Chatter free surface
105. Clear surface Most of the machining and additive manufacturing methods require finishing process to achieve the required quality metrics of the end-product. Conventional approaches to manufacture a part address machine tools which can be a milling tool, a drilling tool, or a cutting tool.

Figure 2:
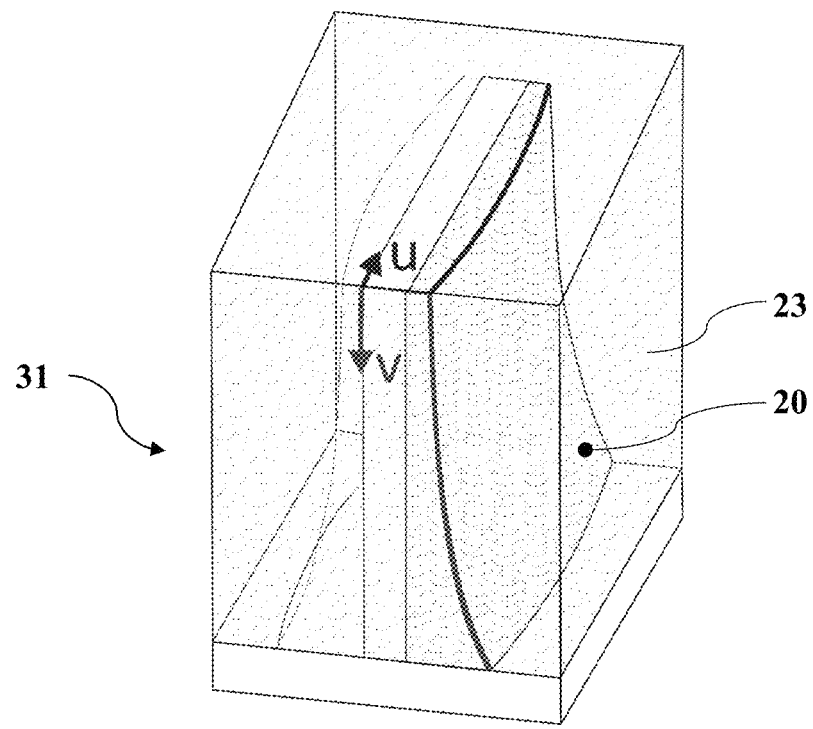
FIG. 2 is a perspective view of the workpiece before roughing process according to present invention.

After either a series of pre-finish machining processes or an additive manufacturing process, the stock thickness (25) left on the design part (26) as shown in FIG. 2 is a key parameter for a prefinished form in a finish machining process. Moreover, the stock thickness (25) governs cuter (11) workpiece engagement boundaries, stiffness of the in-process workpiece (IPW) and hence cutting force, engagement time and chip regeneration. Additionally, stock thickness (25) affects the structural dynamic response of the IPW (21), as well. Therefore, selection of the stock thickness (26) considering the IPW (21) dynamics such as mechanical strength, deflection or vibration is of great importance for chatter stability wherein chatter is defined as self-excited regenerative vibration, where vibration energy is extracted from the machining process itself.

Figure 5:
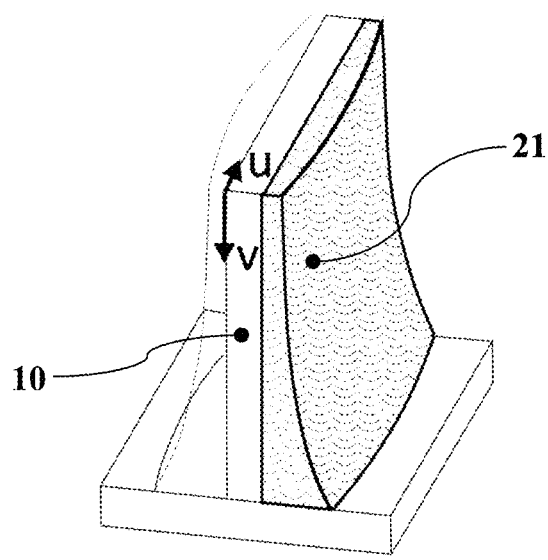
FIG. 5 is a perspective view of the in process workpiece with stock shape and stock thickness.

Generally, this invention suggests a method for generating a tool path (45) to manufacture a part (10) using a Computer Numerical Control (CNC) system, the method comprising the steps;
   a. Generating an initial design part (26) geometry from a geometry modelling program as an input,
   b. Creating a pre-finished in-process workpiece geometry (20), before a finishing process, using a numerical control (NC) program by subtracting and/or adding tool processed volume (23) such that leaving after a post-form having an amount of stock thickness (26) with respect to surface normal (41) vectors of the corresponding surfaces of the design part (26),
   c. Controlling the stock thickness distribution of the said pre-finished in-process workpiece geometry (21) by following the said tool path (45) wherein the stock thickness distribution based on at least one ruling function on the basis of at least one predetermined direction, such that said ruling function is used to determine a stock thickness (25) at a tool location (22) to obtain a variable stock thickness (25) distribution around the design part (26),
   d. The location of a tool (11) to be defined with respect to the design part (26) geometry wherein the said location to be calculated by using the design part (26) surface information and the corresponding stock thickness (25) value which is calculated based on the said ruling function in step c and,
   e. By repeating the step a, b, c, and d, using the individual stock thickness (25) values to calculate a tool path (45) defined a series of subtracting or adding tool location (22) points to be stored in the NC program, such that the tool (11) removes portions of the in-process workpiece (21) material in a controlled manner, leaving a variably controlled stock thickness (25) around the design geometry (26) based on the ruling function used in step b as shown in FIG. 5 and FIG. 8.

Alternatively, the ruling function is defined to allow the stock thickness (25) to be constant up to a first predetermined distance (50) along at least one predetermined direction and the said ruling function defines the stock thickness to be variable up to a second predetermined distance (51).

Figure 3:
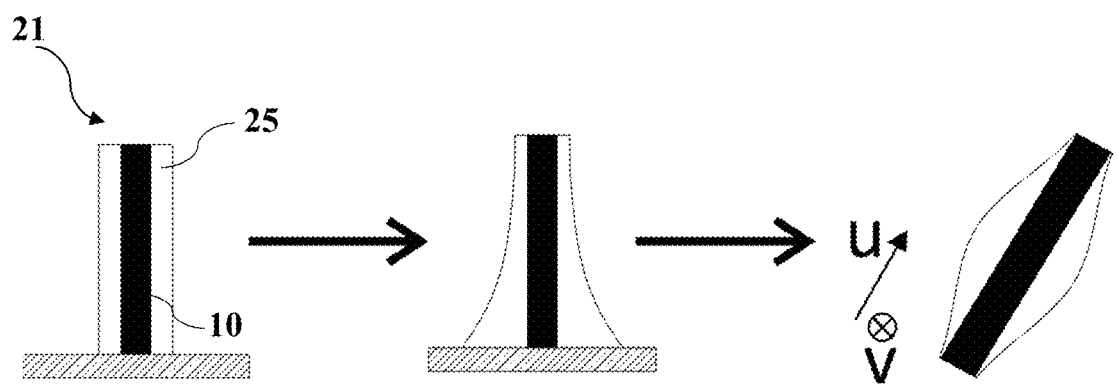
FIG. 3 is a schematic view of the stock distribution according to present invention.
Figure 4:
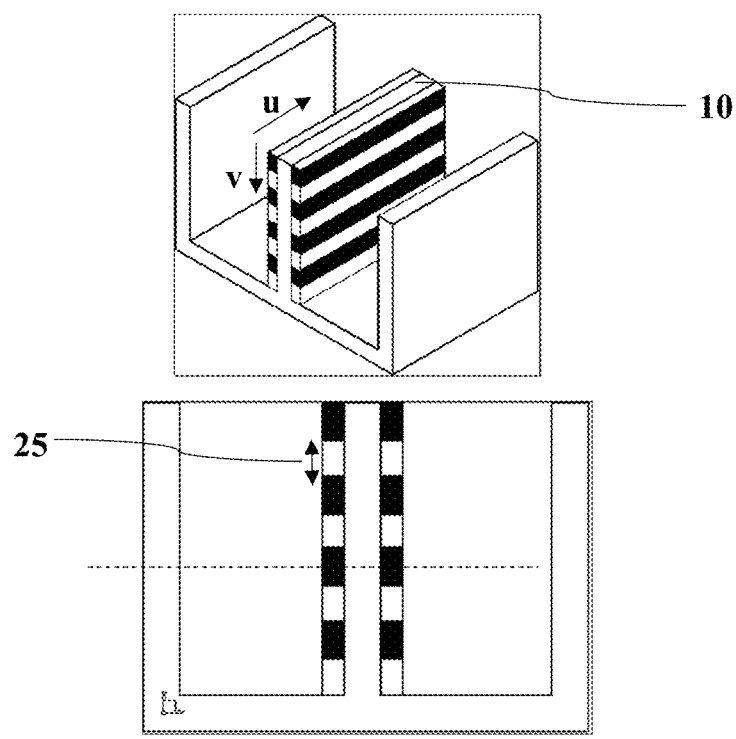
FIG. 4 is a perspective view of the in process workpiece with different stock thickness.
Figure 10:
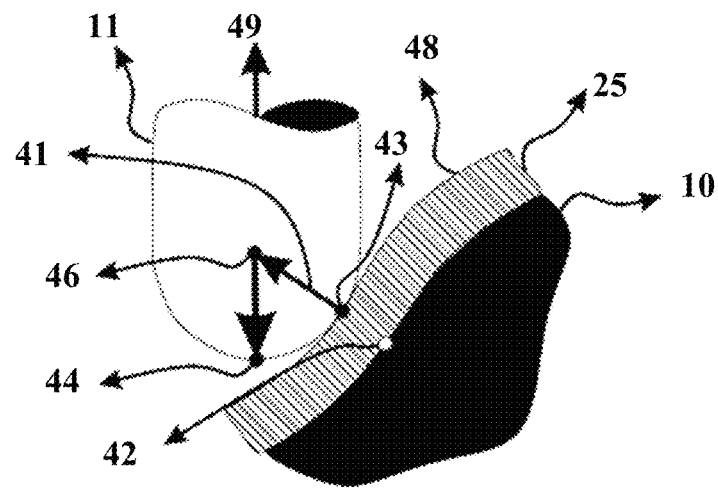
FIG. 10 is an exemplary tool path calculation according to present invention.

With reference to FIG. 10, the numerical control program can further comprise continuously variable sets of surface stock offset with respect to the surface normal (41) vector of the part (10) to be machined, in the semi-finishing tool path (45). Optionally, said subtracting tool (11) is at least one milling tool (11) to remove a portion of in-process workpiece (21) material such that said milling tool (11) performs the cut along u direction which is defined as side direction that orthogonal to the forward direction, first, and then gradually moves along the v direction, as illustrated in FIG. 3, FIG. 4 and FIG. 8, which is defined as forward direction. Additionally, the cutting process can be carried out, first along v direction and then u direction.

Figure 8:
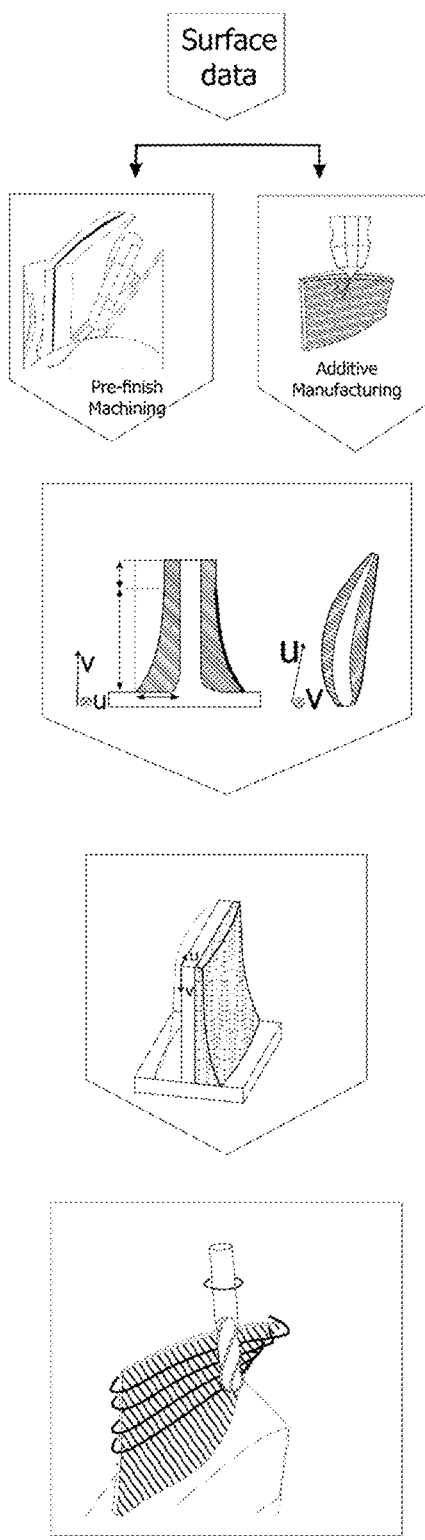
FIG. 8 is a flow diagram illustrating a method fora tool path to manufacture a part using a computer numerical control system.

The preferred method, shown FIG. 8, further comprises, in step a, using a machining tool (11) in the computer numerical control system along a semi-finishing tool path (45) to remove a portion of rough stock material (31) over a first predetermined distance (50) which can be defined by $v_1$, by leaving behind a semi-finishing thickness portion with a varying offset distance calculated at each tool touch point (43) with respect to the surface normal (41) of the part (10) and in step b, using machining tool (11) in the computer numerical control system along a finishing toolpath (45) to remove the semi-finishing stock thickness (25) portion over a second predetermined distance (51) which can be defined by $(1-v_1)$.

It is noted that step b can be performed by an additive manufacturing tool or a 3D Printer along a material deposition toolpath based on the variable offset stock to leave variable stock thickness (25) on the part (10) with respect to the part surface normal (41) behind the material deposition tool path (45).

In an embodiment of the invention, stock thickness (25) and shape selection can be performed based on nominal stock (32), stock distribution along v direction and stock distribution along u direction as shown in FIG. 3. First, the nominal stock (32) thickness is selected for maximum stability based on the lower and upper bounds for stock thickness (25). Then, the stock is distributed considering the part (10) to decrease chatter regeneration at flexible regions without compromising rigidity. The stock thickness (25) is smoothly decreased at flexible regions and increased at neighboring regions, respectively. In the identification of the stock thickness (25) distribution parameters, the stock volume is bounded to the volume calculated using the nominal thickness. Afterward, the stock thickness along v direction is distributed through parameters thickness (t1, t2), according to a piecewise function of v, where $t_2$ depends on $t_1$ and $v_1$ by volume limit as shown in FIG. 8. Therefore, $t_1$ and $v_1$ are iterated for increased stability. At the last stage, the stock thickness (25) is distributed along u direction in a sinusoidal form with coefficients $A_1$ and $A_2$. The sinusoidal variation is phased on the part surface such that the stock thickness (25) is decreased at the edges, i.e. flexible regions, and increased at the middle, i.e. rigid regions. So that, chatter regeneration is decreased by smoothly adjusting stock thickness, especially near the edges.

After the stock thickness (25) distribution is determined, the semi finishing tool path (45) is generated as depicted in FIG. 10 to achieve the variable stock thickness (25) on in process workpiece (21) before finishing. First, the part location point P(u,v) (42) is determined, which is then used in calculation of the stock surface point, i.e. cutter/tool contact point S(u,v) (43). This also enables easy integration of the method with CAM systems. By knowing the part surface normal (41) vector, n, part surface location P(u, v) (42), and stock thickness (25) defined as t(u, v), R (Radius), the cutter location (44) CL (u,v) is calculated.

$$S(u,v)=P(u,v)+n(i)t(u,v) \quad (1)$$

$$CL(u,v)=S(u,v)+R[n(u,v)-ta(u,v)] \quad (2)$$

Figure 12:
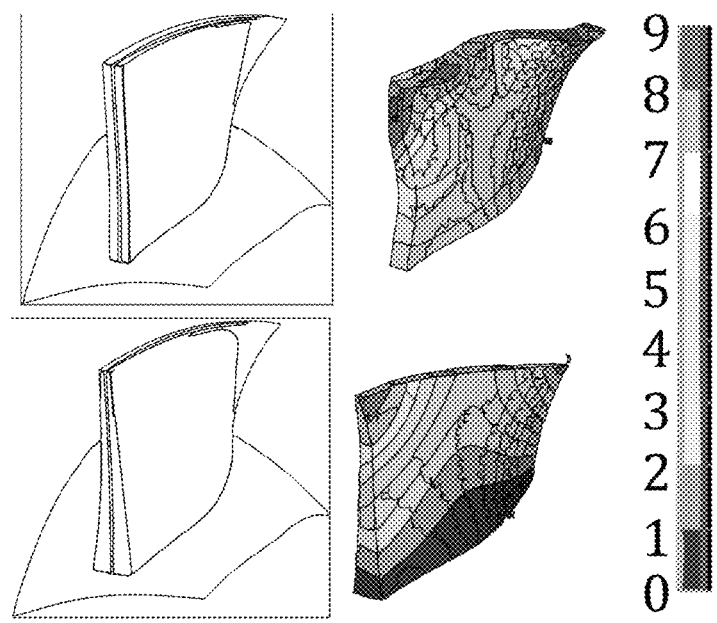
FIG. 12 shows a Finite Element simulations to show the effect of stock shape on dynamics.
Figure 13:
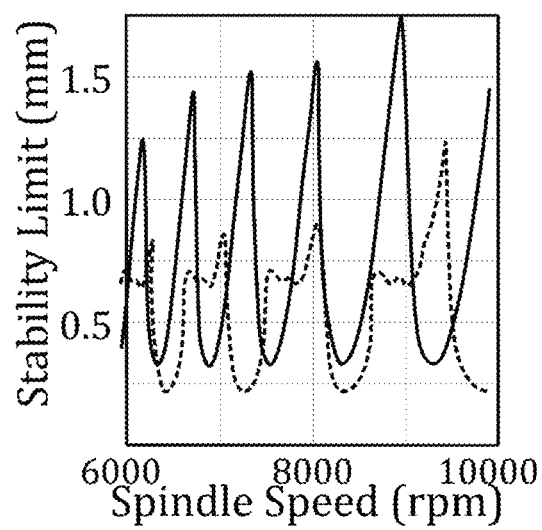
FIG. 13 shows the effect of stock shape on dynamics and stability.

In one exemplary embodiment, the present invention provides a method to select the stock thickness (25), stock shape for increased stability, optionally in 5-axis milling of thin-wall parts (10). In the semi-finishing tool path, just before the finishing pass, the stock thickness (25) and shape can be decided considering in process workpiece (IPW) (21) dynamics using finite element (FE) simulations as shown in FIG. 12 and FIG. 13 to increase stability limits. However, in conventional tool path (45) generation in the current state of the art, such issues are ignored as illustrated in FIG. 1.

Figure 6:
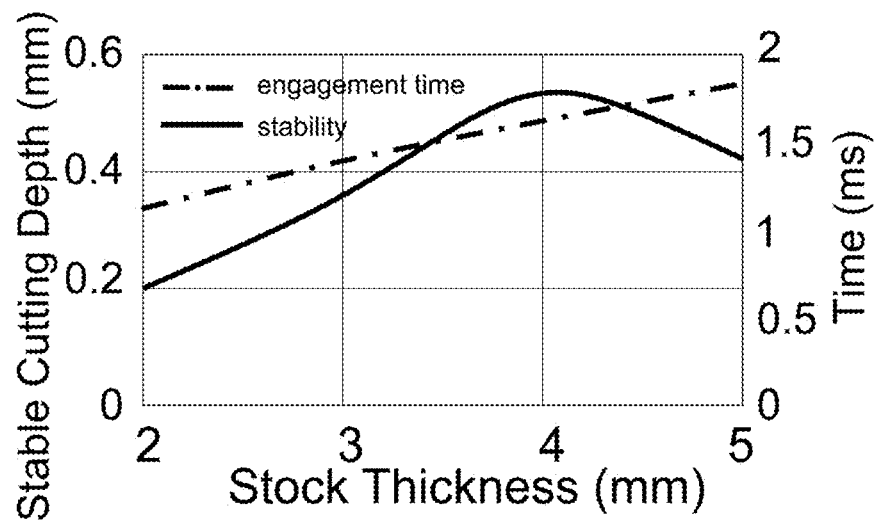
FIG. 6 shows the effect of the stock thickness on stability and engagement time, according to present invention.

With reference to FIG. 6, as the finishing time depends on the number of passes along the part height, selection of cutting depth is crucial which may be limited by stability and scallop height. There are three main limitations in cutting depth selection; IPW (21) dynamics, tool dynamics and scallop height.

With reference to FIG. 12 and FIG. 13, enhanced stability can be achieved by tailoring the stock shape. The compliance and chip regeneration at top sections can be decreased thanks to variable stock thickness (25), i.e. from 1.0 to 3.5 mm rather than 2 mm constant stock, leading to 30% increase in absolute stability limit, i.e. from 0.25 to 0.33 mm. Moreover, in finishing, the stock thickness (25) is usually less than 20% of tool diameter, which is classified as low radial immersion. When is considered in tool axis (49) selection, may be excessively tilted away from the surface normal. Similarly, chip regeneration along the flexible IPW (21) direction decreases, leading to a 25% increase in absolute stability, i.e. from 0.35 mm to 0.5 mm.

In the proposed invention, the stock thickness can be determined by at least one ruling function at a tool location (22) to obtain a variable stock thickness (25) distribution around the design part (26). In an embodiment shown in FIG. 6 and FIG. 9, said ruling function can be a continuous function such as tangent function to calculate the stock thickness values. Optionally said ruling function is a non-linear function since the mechanical behavior of the workpiece, such as deflection and vibration, is not linear, thus defining the stock thickness with a non-linear function provides a more accurate control in the structural behavior of the IPW.

Figure 9:
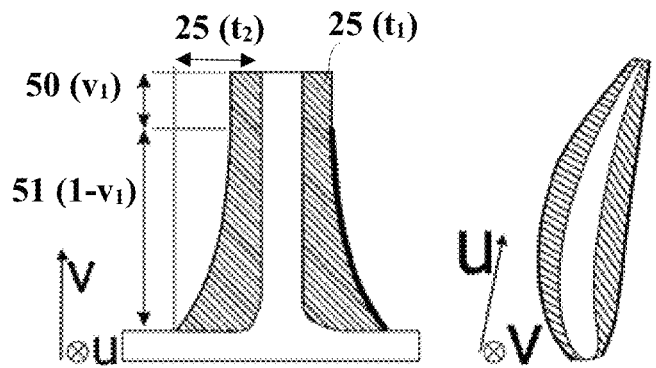
FIG. 9 is schematic view of the stock thickness and shape selection.

FIG. 9 illustrates an exemplary method for selection of stock thickness and stock shape that the stock thickness can be defined in u (feed) and v (crossfeed) directions based on exponential and sinusoidal shape function. The variation along v is defined as a piecewise function to represent constant and variable stock regions, where setting v1=1 leads to constant stock along v. At each v level, the nominal thickness C(v) is introduced to the sinusoidal variation along u. Consequently, the stock thickness (25), t(u,v), is expressed by Equation (3).

$$t(u, v) = A_1 C(v) + A_2 C(v)\sin(\varphi + \omega u) \quad (3)$$

$$C(v) = \begin{cases} t_1 & \text{if } v \le v_1 \\ ae^{(bv)} & \text{if } v > v_1 \end{cases} \quad (4)$$

A1 : Coeffecient
A2 : Coefficient
$\varphi$ : Phase Angle
$\omega$ : Angular frequency of the variation along $u$ direction However, the stock shape representation is not limited to these equations. Any functional shape can be introduced to represent the stock shape to form the pre-finish IPW (20) together with the design part volume.

In a possible embodiment of the invention, said part may be a consecutive blade (52), thereby a thin wall of the consecutive blade may become structurally very flexible.

Exemplary Experimental Work for Proof of Concept

Figure 7:
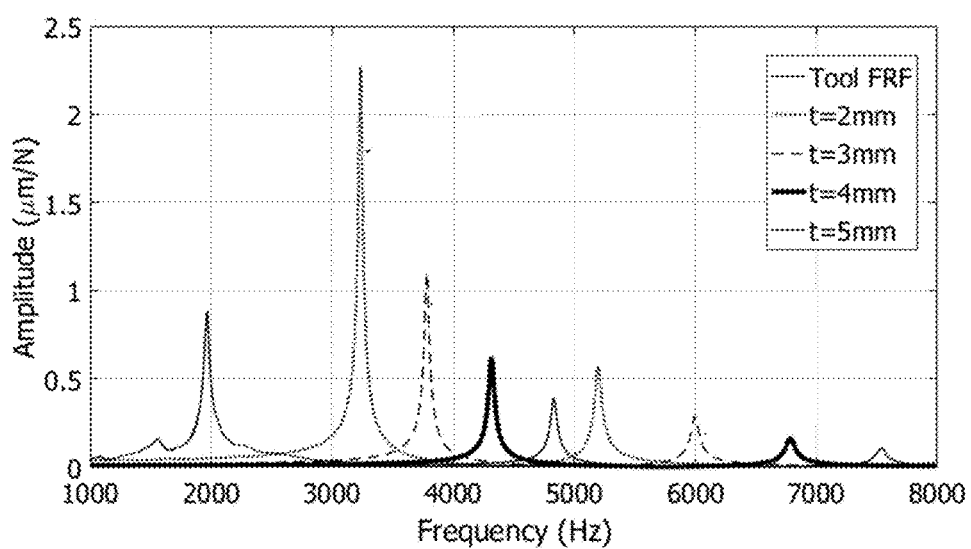
FIG. 7 shows the effect of the stock thickness of in process workpiece dynamics.

In scope of the invention, the effect of stock thickness (25) on the finishing of a 5 mm thick aluminum plate is shown in FIG. 7. The frequency response function (FRF) of the IPW (21), absolute stability limit which is a stable region, and tool engagement time may be simulated for 2 mm thickness, 3 mm thickness, 4 mm thickness, and 5 mm thickness of one-sided stock, i.e. total IPW thickness of 9 mm, 11 mm, 13 mm, and 15 mm, where the tool (11) can be 12 mm dia. It is seen in FIG. 7 that as stock thickness increases the IPW FRF amplitude decreases and converges to that of the tool after 4 mm thickness of stock but engagement time gets longer as shown in 6 causing more chatter regeneration. Thus, while gaining dynamic stiffness, the absolute stability limit reaches its peak at one sided thickness of 4 mm, thereafter further increasing the stock thickness (25) decreases absolute stability as the tool dynamics start to govern stability. In conclusion, increased stock thickness (25) leads to stiffer IPW (21) but may have adverse effects due to longer engagement time.

Figure 11:
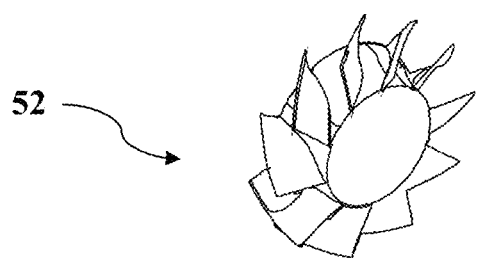
FIG. 11 is a perspective view of a turbine disk manufactured by using a computer numerical control system.

The proposed approach is demonstrated on the 5-axis milling of the consecutive blades (52) given in FIG. 11, which is 60 mm and 40 mm high at and trailing edges, respectively. The width between consecutive blades (52) varies from 44 mm to 22 mm along the consecutive blade (52) axis. Simulations and experiments are performed for AL6061-T6 which is a material used in the aerospace industry with tangential and radial cutting force coefficients of Kt=1200 MPa and Kr=400 Mpa, respectively. In finishing, 12 mm ball-end mill with 3 flutes is used. The surface roughness requirement is 12 µm after the finish pass, corresponding to 0.75 mm of cutting depth limitation.

Figure 14:
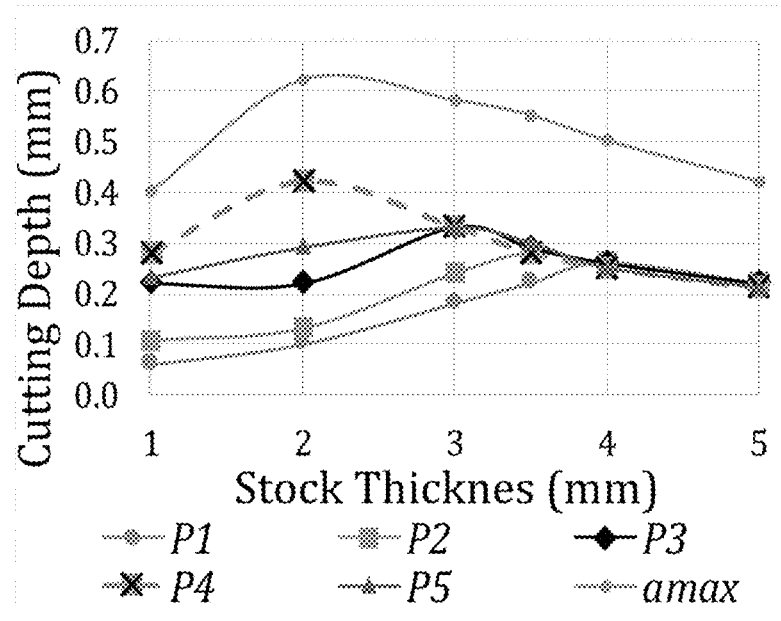
FIG. 14 shows the stability limits for varying stock thickness.
Figure 15:
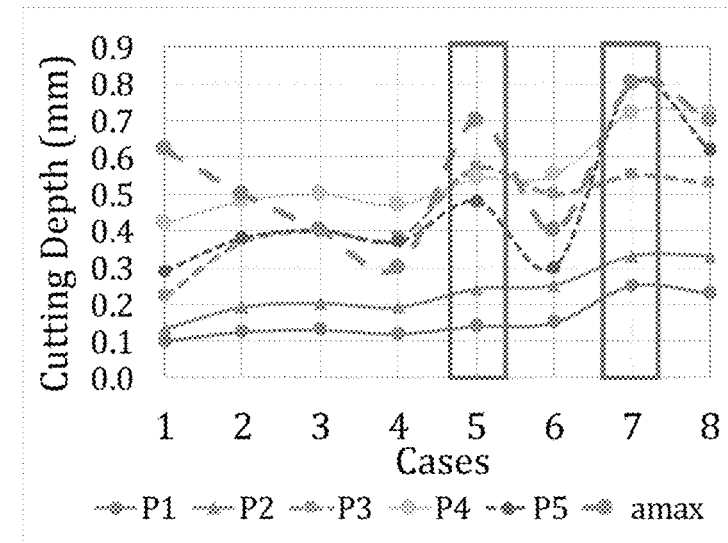
FIG. 15 shows the stability limits for varying stock shape.

Stability analysis is performed at five points on the part (10), as an indication of achieved improvement in the stability of the finish milling, for stock thickness (25) values of 1, 2, 3, 3.5, 4 and 5 mm. The absolute stability limits are comparatively shown in FIG. 14. 1 mm stock thickness (25) leads to a very low absolute stability. As the stock thickness (25) is increased to 2 mm and 3 mm, the absolute stability limit increases at all points. However, after 3.5 mm, the absolute stability limit decreases. Providing the highest maximum stability, $a_{max}$, 2 mm nominal stock (32) is selected. Considering the 5 mm of limitation in the maximum stock thickness (25), eight cases are determined to compare the effect of stock shape as given in Table 1. The corresponding absolute stability limits for the generated cases are plotted in FIG. 15, where Case 5 and Case 7 outstands. Case 1 is used as a benchmark, where Case 2 to Case 6 there is stock thickness (25) variation only along the v direction, Case 7 and Case 8 involve variation of stock thickness (25) along both u and v directions.

| Case | Description | $t_1$* | $v_1$ | $t_2$* | A1 | A2 |
|---|---|---|---|---|---|---|
| 1 | Constant stock | 2.00 | 0.00 | 2.00 | 1 | 0 |
| 2 | Variable along v | 1.50 | 0.05 | 2.50 | 1 | 0 |
| 3 | Variable along v | 1.50 | 0.10 | 2.75 | 1 | 0 |
| 4 | Variable along v | 1.50 | 0.25 | 3.00 | 1 | 0 |
| 5 | Variable along v | 1.00 | 0.05 | 3.50 | 1 | 0 |
| 6 | Variable along v | 0.50 | 0.05 | 4.50 | 1 | 0 |
| 7 | Variable along u-v | 1.00 | 0.05 | 3.50 | 0.8 | 0.2 |
| 8 | Variable along u-v | 1.00 | 0.05 | 3.50 | 0.7 | 0.3 |

*units are in mm

Figure 16:
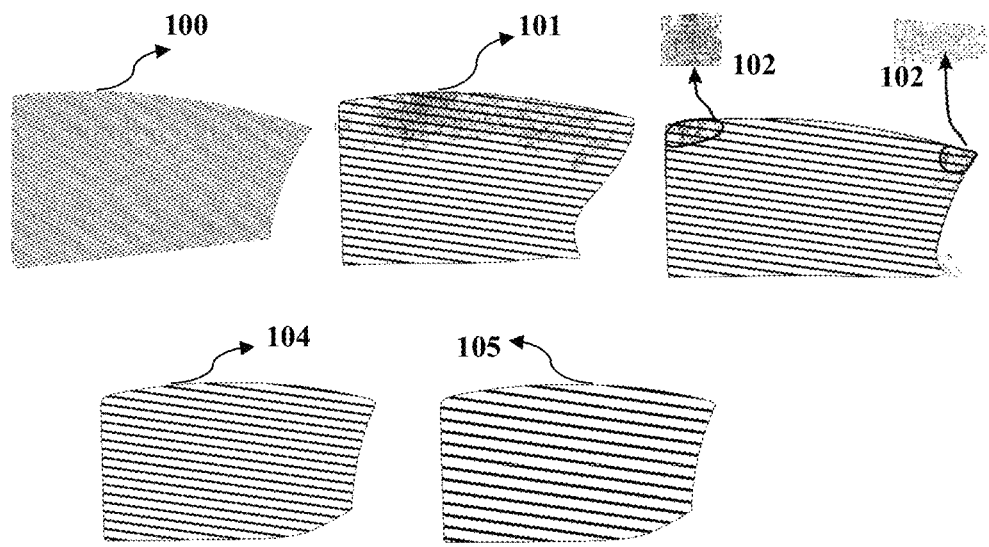
FIG. 16 shows the illustration of surface quality and tool path.
Figure 17:
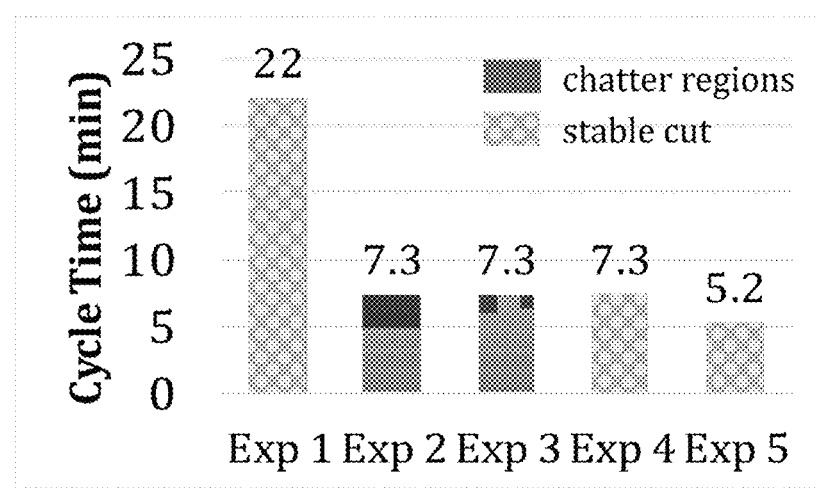
FIG. 17 shows the cycle time comparisons in experimental results.

To verify the predictions, five cutting tests are performed based on cases from Table 1. In Experiment 1, the conditions from Case 1 were used as the benchmark case, where there 2 mm of constant cutting stock was left around the blade. The cut was carried out at 0.2 mm cutting depth, around absolute stability. A stable cut (100) was achieved as shown in FIG. 16. Then, for the same stock thickness (25) as in Case 1, the cutting depth was increased to 0.6 mm in Experiment 2, where chatter (101) was observed at the top sections of the workpiece as depicted in FIG. 16. In Experiment 3, the use of stock shape optimization was demonstrated based on Case 5. As the stock was decreased at top sections, the overall stability increased. The cut was almost stable except regional chatter at the leading and trailing edges (102) in FIG. 16. Experiment 4 was conducted according to Case 7, where the stock thickness at the edges was decreased for less regeneration, leading to a wide common range of high stability around 9500 RPM. In Experiment 4, the chatter-free surface (104) was obtained at 0.6 mm of cutting depth, as shown in FIG. 16. In the cutting test, the cutting depth was increased from 0.6 mm to 0.80 and the process was stable and resulted in the clear surface (105). With reference to FIG. 17 by appropriate selection of the IPW (21) shape the chatter-free finishing time can be drastically decreased from 22 minutes to 7 minutes.

Several advantages of the proposed system compared to the available ones can be listed as follows:
- An enhanced methodology for stability optimal selection of the stock thickness and shape of thin-wall parts (10), where especially the top 5-10% section of the part is prone to chatter.
- The nominal stock thickness is selected by trading-off between IPW stiffness and chatter regeneration to achieve the conditions increased stability. Then, distribution is performed along cross feed and feed directions for reduced chatter regeneration at flexible regions of the part without compromising dynamic stiffness.
- An important advantage of this invention is that the stability limits in finish milling of flexible parts (10) can be increased at by least 50% through adjusting the stock thickness and shape. The finish milling time can be cut down to 30% by tailoring the stock shape for increased stability.
- Thanks to this invention, selection considering the flexible directions of the IPW and the tool leads to enhanced stability limits.
- Thanks to this invention, time consuming stock surface creation at the process planning phase is eliminated as the desired stock surface is automatically created by use of this invention.

What is claimed is:

1. A method for generating a tool path to manufacture a part using a computer numerical control system comprising the steps of:
   (a) generating an initial design part geometry from a geometry modelling program as an input and using at least one tool in the computer numerical control system along a semi-finishing tool path for removing a portion of a rough stock material over a first predetermined distance by leaving behind a semi-finishing thickness portion with a varying offset distance calculated at each tool contact point with respect to a surface normal of the part;
   (b) creating a pre-finished in-process workpiece geometry before a finishing process, using a numerical control program by a subtracting and/or adding tool processed volume to leave behind a post-form having an amount of a stock thickness with respect to surface normal vectors of corresponding surfaces of the initial design part geometry for overcoming vibration or chatter events during the finishing process, wherein the numerical control program further comprises continuously variable sets of a surface stock offset with respect to at least one surface normal vector of a part surface to be machined, in a semi-finishing tool path, and using the at least one tool in the computer numerical control system along a finishing tool path for removing the semi-finishing thickness portion over a second predetermined distance;
   (c) controlling a stock thickness distribution of an in-process workpiece geometry by following the tool path wherein the stock thickness distribution is based on at least one predetermined direction of the initial design part geometry, wherein a variable stock thickness distribution around the pre-finished in-process workpiece geometry is obtained;
   (d) locating the at least one tool on a tool path to be generated with respect to the initial design part geometry wherein a location is calculated by using design part surface data of a corresponding design part and a corresponding stock thickness value; and
   (e) repeating the steps a), b), c), and d), and using individual stock thickness values to calculate the tool path defined as a series of subtracting or adding tool location to be stored in the numerical control program, wherein the at least one tool removes a predefined portion of an in-process workpiece material in a controlled manner, leaving a variably controlled stock thickness around the initial design part geometry.

2. The method according to claim 1, wherein a ruling function is defined in step c) to allow the stock thickness to be constant up to a first predetermined distance along the at least one predetermined direction and the ruling function defines the stock thickness to be variable up to a second predetermined distance.

3. The method according to claim 2, wherein the ruling function is a continuous ruling function for calculating the stock thickness around an in-process workpiece.

4. The method according to claim 3, wherein the numerical control program further comprises continuously variable sets of a surface stock offset with respect to at least one surface normal vector of a part surface to be machined, in a semi-finishing tool path.

5. The method according to claim 3, wherein a subtracting tool is at least one milling tool for removing a portion of the in-process workpiece material, wherein the at least one milling tool first performs a cut along a U direction defined as a side direction orthogonal to a forward direction of a tool axis.

6. The method according to claim 2, wherein the ruling function is a nonlinear ruling function for calculating the stock thickness around an in-process workpiece.

7. The method according to claim 6, wherein the numerical control program further comprises continuously variable sets of a surface stock offset with respect to at least one surface normal vector of a part surface to be machined, in a semi-finishing tool path.

8. The method according to claim 6, wherein a subtracting tool is at least one milling tool for removing a portion of the in-process workpiece material, wherein the at least one milling tool first performs a cut along a U direction defined as a side direction orthogonal to a forward direction of a tool axis.

9. The method according to claim 2, wherein the ruling function is a continuous ruling function for calculating the stock thickness around an in-process workpiece.

10. The method according to claim 2, wherein the ruling function is a nonlinear ruling function for calculating the stock thickness around an in-process workpiece.

11. The method according to claim 2, wherein the numerical control program further comprises continuously variable sets of a surface stock offset with respect to at least one surface normal vector of a part surface to be machined, in a semi-finishing tool path.

12. The method according to claim 2, wherein a subtracting tool is at least one milling tool for removing a portion of the in-process workpiece material, wherein the at least one milling tool first performs a cut along a U direction defined as a side direction orthogonal to a forward direction of a tool axis.

13. The method according to claim 1, wherein a subtracting tool is at least one milling tool for removing a portion of the in-process workpiece material, wherein the at least one milling tool first performs a cut along a U direction defined as a side direction orthogonal to a forward direction of a tool axis.

14. The method according to claim 1, wherein step b) is performed by an additive manufacturing tool or a 3D Printer along a material deposition tool path based on a variably offset stock to leave a variable stock thickness on the part with respect to a surface normal of the in-process workpiece.

* * * * *